United States Patent [19]
Blake

[11] 3,849,027
[45] Nov. 19, 1974

[54] FLUIDIC CONSTANT PRESSURE PUMP CONTROL

[76] Inventor: Frederick H. Blake, 5712 Rutgers, La Jolla, Calif. 92037

[22] Filed: Aug. 1, 1973

[21] Appl. No.: 384,740

[52] U.S. Cl. .............................................. 417/223
[51] Int. Cl. ........................................... F04b 49/00
[58] Field of Search ......... 417/15, 223, 319, 44, 38, 417/395; 192/85 R; 91/3; 137/85, 805, 810

[56] References Cited
UNITED STATES PATENTS

| | | | |
|---|---|---|---|
| 862,867 | 8/1907 | Eggleston | 417/395 |
| 2,024,759 | 12/1935 | Caserta | 417/223 |
| 2,416,980 | 3/1947 | Burns | 417/223 |
| 3,054,421 | 9/1962 | Corey | 417/223 |
| 3,113,582 | 12/1963 | Hudson | 137/85 |

Primary Examiner—William L. Freeh
Attorney, Agent, or Firm—Brown and Martin

[57] ABSTRACT

A control system for producing a constant pressure output despite input power and speed and output demand fluctuations. The control incorporates a fluidic sensor to determine the position of a free floating piston in an accumulator T off the main discharge line. The sensed position of the piston is translated into a command to a variable speed clutch between the pump and its driving motor. The system accommodates variable or intermittent demand by its accumulation effect, and eliminates the requirement for frequent pump speed changes, by incorporating mechanical or air pressure lost motion in the system response, to command an average pump speed.

8 Claims, 5 Drawing Figures

FLUIDIC CONSTANT PRESSURE PUMP CONTROL

BACKGROUND OF THE INVENTION

There are a number of industrial requirements for controlling the speed of a pump to produce a constant pressure output. Constant pressure output may be utilized for example to accommodate equipment, in which the input pressure determines the size, or quantity of material to be molded, or otherwise processed. A machine for making meat patties or similar shapes would have this requirement.

Prior art systems for maintaining constant pressure output have not been satisfactory, especially those systems used with non-liquid compressible products. Certain of the prior art devices use a product bypass, whereby the product is bypassed from the output of the pump and returned to the storage reservoir during low demand. The product is thereby repetitively circulated through the system. This system can cause heat or other product damage.

Other prior art systems utilize centrifugal pumps to avoid the requirement for a constant output. These pumps are relatively inefficient and unsatisfactory on plastic material such as ground meat and do not provide accurate pressure control.

A product pressure control has been utilized in the industry, incorporating an accumulator piston section and a piston rod position sensor. The sensor detects piston position by electromagnetic sensing. These sensors are satisfactory in the laboratory environment, but in the working environment are unduly sensitive to water, grease, dirt and humidity. Additionally, they are expensive to purchase and difficult to maintain, particularly where much of the other equipment in a typical facility would utilize fluidic or similar controls and therefore the personnel are not likely to have the skills necessary to maintain electronic controls. This type of equipment is also subject to malfunction and easily damaged by the voltage transients that may occur in such plants. The electronic control system is not suitable for use with existing equipment and must be purchased as a complete unit at considerable capital outlay.

Thus, it is desirable to have a constant pressure pump control, that was inexpensive to purchase and easy to maintain, particularly if such a device was not sensitive to the working environment and adaptable to existing equipment of all sizes. Such a system would additionally be desirable if it had protection against overspeed of the pump, and quickly responded to changes in the output by calling for a change in the input power and speed without requiring bypass of the product or other potentially damaging processing of the product.

SUMMARY OF THE INVENTION

An exemplary embodiment of the invention incorporates fluidic means for producing a change in the air pressure in response to the position of a free floating piston. The piston is part of an accumulator piston-cylinder combination on the output side of a pump, and is backed by a reference pressure which corresponds to the pressure desired for the pump output. The fluidic means controls the pump speed through a device between the motor and pump, such as an air pressure controlled, variable speed, oil sheer, clutch drive.

Mechanical or air lost motion is introduced into the system to accommodate intermittent demand, such as would be encountered with molding machines, to maintain a substantially constant pump speed so long as the total demand remains within limits. The effect of the lost motion mechanism is to introduce an averaging capability for the system so that pump speed changes are called for only when the demand volume varies above or below upper and lower operating limits. The preferred fluidic sensor is a proportional proximity sensor that operates in association with a ramp on the accumulator piston rod to produce an air pressure analog of piston position. The ramp is adjustable to vary the overall sensitivity rate of the system. The system also incorporates a limiting valve to completely disconnect the motor from the pump if too much pumped product accumulates on the output side of the system. The invention contemplates that either a cone jet sensor or a vortex sensor may be used in association with the ramp described. The output of this sensor is amplified by a proportional amplifier and directed to the controlling port of the oil clutch.

The resulting system is adaptable to almost any existing equipment where speed control is obtainable through an air pressure variation. The basic system components can accommodate themselves to any size pumping equipment. Fluidic sensors are basically self-cleaning and not sensitive to dirt or other foreign matter accumulations. Additionally, they are not sensitive to temperature and humidity and are less expensive to install than electronic equivalents. Voltage transients that can disable electronic devices have no effect on the system, and the fluidic sensors fast response and low inertia are comparable to the best of the electronic systems. The accumulator technique eliminates the need for product bypass and therefore reduces product damage while accommodating fluctuations in the output demand or intermittent demand machines.

It is therefore an object of the invention to provide a new and improved fluidic constant pressure pump control.

It is another object of the invention to provide a new and improved pump control utilizing few moving parts.

It is another object of the invention to provide a new and improved pump control that is not sensitive to voltage fluctuations, temperature or humidity changes or foreign matter accumulations.

It is another object of the invention to provide a new and improved pump control that is adaptable to existing pumping equipment.

It is another object of the invention to provide a new and improved control that may be utilized with any motor and pump combination.

It is another object of the invention to provide a new and improved pump control that quickly responds to output variations.

It is another object of the invention to provide a new and improved pump control that does not require bypass of the pumped product.

Other objects and many attendant advantages of the invention will become more apparent upon a reading of the following detailed description together with the drawings in which like reference numerals refer to like parts throughout and in which.

Figure 1:
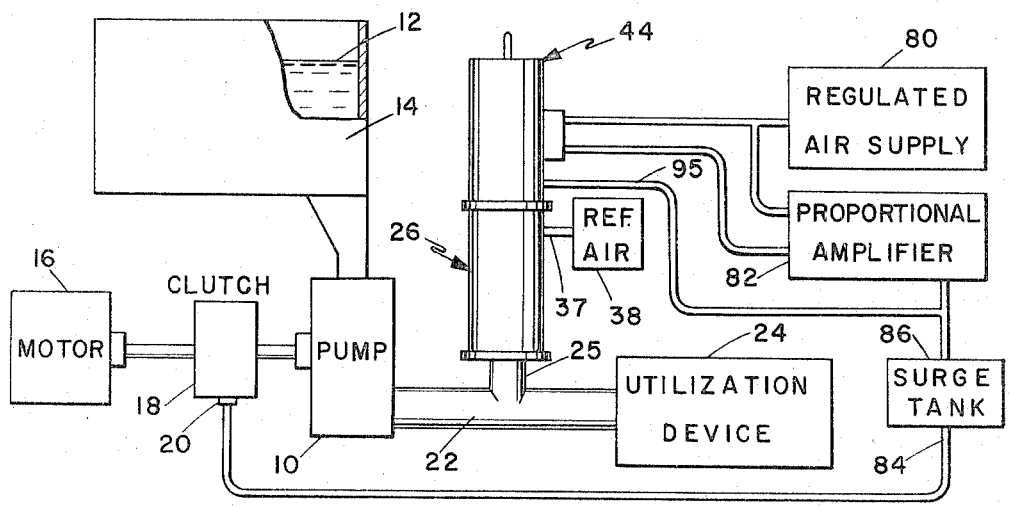
FIG. 1 is a diagram of a typical system incorporating the pump control.

Referring now to the drawings, there is illustrated a pump control system incorporating an embodiment of the invention. The pump 10 is supplied with a source of product 12 in a bin 14 or a lower pressure supply line. Power is delivered from the motor 16 through a transmission or a clutch 18. Clutch 18 is a variable speed type that is controlled by air pressure through port 20. The pumped product is carried by a conduit 22 to a product utilization device 24. Variations in the pump output pressure or in the requirements of the device 24 are accommodated in T section 25, on which is mounted a lower cylinder 26 containing a free floating accumulator piston 28. Piston 28 has seals 30 and 32 on skirts at its opposite ends 33 and 36. These seals are made effective by ensuring a good sealing pressure drop across each seal with vent 34. Vent 34 vents the intrapiston space to atmospheric pressure, thereby creating a pressure drop across the seals 30 and 32 to provide good sealing. The reference side 36 of the piston 28 is maintained at a reference pressure by a source of reference pressure 38 through inlet 37.

The movements of the free floating piston 28 are transmitted via piston rod 42 to the upper cylinder 44. Cylinder 44 includes a monitor piston 46 that bears against the walls of the cylinder through an O-ring 48. The O-ring is for the purpose of creating sufficient friction to cause the piston to remain in whatever position it is left. The upper and lower portions of the upper cylinder are vented by relief vents 47. Piston rotation is prevented by a guide rod 52 through the piston flange 54. Piston 46 carries an adjustable ramp 56. The ramp is adjustable through a threaded screw element 58 on the piston 46. Upper and lower lost motion stops 60 and 62 are secured to the piston rod for movement therewith and are illustrated as being set to provide the indicated range of movement of the piston 28 before any movement of the monitor piston 46 is induced. When the free floating piston 28 reaches that upper limit of free travel indicated for its normal free operating range, it, stop 62, contacts the monitor piston and moves it, with it, in an upward direction thereby changing the position of the ramp. Similarly, when the position of the accumulator piston is below the normal operating range, the upper limit stop 60 contacts the monitor piston and moves it downward in the cylinder 44.

Figures 2, 3, 4, 5:
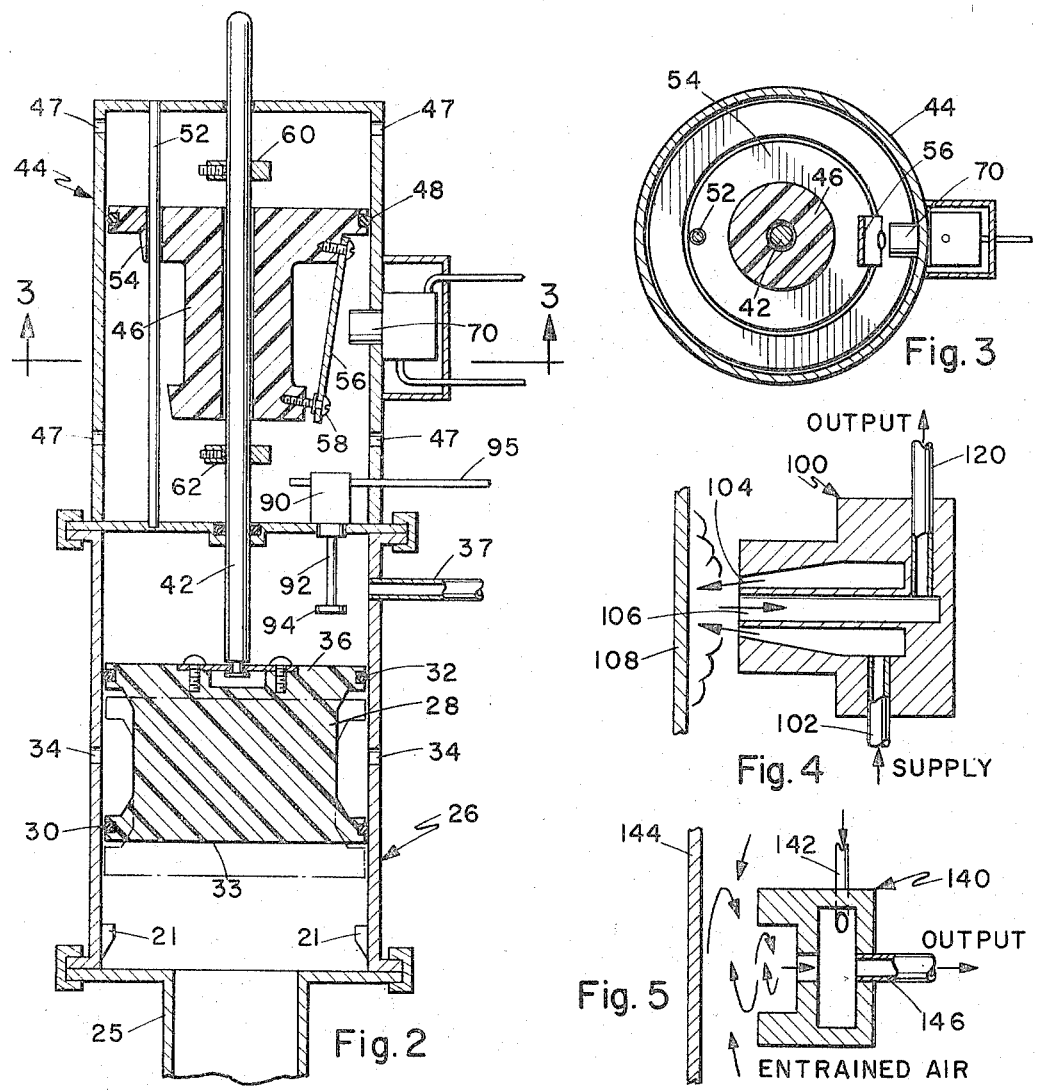
FIG. 2 is a longitudinal sectional view of the basic control unit.
FIG. 3 is a sectional view taken on line 3—3 of FIG. 2.
FIG. 4 is a cross section of one suitable type of position sensor.
FIG. 5 is a cross section of an alternative sensor.

The movement of the ramp has the effect of changing the air gap presented to a fluidic proportional gap sensing or proximity sensing device 70. This sensor may be of the cone jet type illustrated in FIG. 4 or may utilize the vortex sensing structure illustrated in FIG. 5. Thus the monitor piston 46 translates the change in average free floating piston 28 position into a variable air gap, which in turn is translated by the cone jet or other proportional proximity sensor to a change in airflow pressure from the source of low pressure air 80. This airflow pressure is amplified by the proportional amplifier 82 (also supplied from the source of low pressure air 80) and delivered to the clutch 18 by line 84. If it is desired to accomplish the averaging effect of the lost motion mechanism previously described in a different way, it may be desirable to provide a storage volume 86 in line 84 to act as a surge tank and damp out variations caused by fluctuations or intermittent demand.

The vortex sensor 140 (see FIG. 5) produces a vortex of supply air delivered through port 142. The approach of a surface 144 restricts the supply of ambient air entrained into the center of the vortex cone and thereby produces a reduced pressure at the output 146. This pressure is dependent on the proximity of the surface but the total pressure change is small so that the vortex sensor is normally used in conjunction with a proportional amplifier to increase the effective range and the inverted output.

The cone jet 100, (see FIG. 4) exhausts a continuous flow of supply air from port 102 through a conical nozzle 104. The conical form of the air stream produces a low pressure region at the sensing port 106 unless a surface 108 is moved into proximity. Such a surface reflects a portion of the supply air to raise the pressure at the sensing port 106. The pressure increases as the surface is moved closer. Thus the flow from the output 120 is an analog of the distance between the nozzle and surface.

The figures also illustrate that a snap type dump valve 90 is positioned in the upper cylinder and has an actuating rod 92 and actuating button 94 extending into the lower cylinder in a position to be contacted by the reference side 36 of the piston 28. The dump valve is for the purpose of lowering the air pressure delivered to the clutch to atmospheric pressure, and thereby disconnect the motor 16 from the pump 10. This condition would exist only if a malfunction in the machine or over limit cycling were to occur, and would take place prior to the dumping of product through the vent 34. The piston would contact button 94 opening the dump valve 90 which would then remain in the open position until reset, (by return downward movement of piston 28) thereby venting the control pressure through line 95, disabling the apparatus, and preventing damage to the motor and pump. Lower limit stops 21 are provided to limit the low pump output travel of the piston.

OPERATION

In use the pump control of the invention would be brought into operation by applying the reference pressure 38 to the reference side 36 of piston 28. Since equal piston areas are utilized between the reference side 36 and the accumulator side 33, the piston transmits the same reference pressure to the pumped product 12 in the accumulator T section. The low pressure air supply 80 is also turned on to activate the fluidic sensor and produce a control signal through line 84 and port 20 to the clutch 18. Then the motor 16 is turned on and the output apparatus 24 activated. During normal system operation, the output device 24 would utilize pumped product at a rate that had previously been determined to be within the average range provided for. The lost motion or surge tank devices would be pre-set for product size. Thus the piston 28 will fluctuate in the average range illustrated. When a variation occurs in the product demanded or a change occurs in the output of the pump, additional pumped product beyond that necessary to maintain the requirements of the output device 24, forces the accumulator piston 28 upwards in the cylinder and increases the gap presented to the fluidic sensor. This decreases the airflow pressure on the sensor output 100 or 140, and thereby the amplified output delivered to the clutch 18. The decreased pressure delivered to clutch 18 would result in a lower speed delivered to pump 10 and therefore eventually reduce the amount of pumped product to lower piston 28 in the accumulator cylinder. Similarly, if the quantity of product being pumped was less than the requirement of the output device, the piston 28 would move downward in the cylinder to provide the additional product at the reference pressure until the upper lost motion stop 60 contacted the monitor piston and caused movement of that piston and its associated ramp, reducing the gap presented to the proximity sensor, and increasing the airflow pressure on the output of that sensor. The increased airflow pressure would be amplified and delivered to the clutch 18, producing increased speed delivered to pump 10.

Having described my invention, I now claim:

1. A control system for producing a constant pressure output of pumped product from a pump in an intermittent demand cycle comprising:
   an accumulator piston-cylinder having a piston with a reference side and a regulating side,
   said regulating side being in fluid communication with the output of said pump,
   said reference side being maintained at a reference pressure to transmit said reference pressure to the pumped product from said pump,
   fluidic means comprising a sensor positioned to detect the movement of a piston controlled element operatively associated with said accumulator piston-cylinder for producing change in the quantity of a control air-flow pressure in response to said piston moving beyond predetermined operating limits, and
   speed control means in fluid communication with said control air flow pressure for producing proportional change in the input speed of said air pump in response to changes in said control air flow pressure.

2. A control system according to claim 1 wherein:
   said fluidic means includes a surge volume between said fluidic means and said speed control means.

3. The control system according to claim 1, further including:
   limit means for disconnecting power to said pump when said piston position exceeds a predetermined maximum displacement,
   said limit means comprising an air valve in fluid communication between said control air flow pressure and ambient pressure and including a valve actuator,
   said valve actuator is positioned to be contacted by said piston at said predetermined maximum displacement.

4. A control system according to claim 1 wherein:
   said fluidic means comprises a proportional proximity sensor.

5. A control system according to claim 4 wherein:
   said proportional proximity sensor comprises a cone jet.

6. A control system according to claim 4 wherein:
   said proportional proximity sensor comprises a vortex sensor.

7. The control system according to claim 4, wherein:
   said piston controlled element comprises a ramp means positioned by said piston for presenting an air gap to said sensor that is a function of said piston controlled element.

8. A control system according to claim 7 wherein:
   said ramp means is connected to said piston through a piston rod that has upper and lower lost motion stops;
   said upper lost motion stop contacts said ramp at an extreme of normal piston travel and said lower lost motion stops contacts said ramp at the opposite extreme of normal piston travel.

* * * * *